United States Patent [19]

Greutert

[11] 4,256,585
[45] Mar. 17, 1981

[54] COFFEE FILTER WITH DRIP TRAY

[75] Inventor: Albert Greutert, Sachseln, Switzerland

[73] Assignee: Maxs AG, Sachseln, Switzerland

[21] Appl. No.: 142,093

[22] Filed: Apr. 21, 1980

[30] Foreign Application Priority Data

Apr. 23, 1979 [DE] Fed. Rep. of Germany ... 7911828[U]

[51] Int. Cl.³ .............................................. B01D 25/04
[52] U.S. Cl. .................................. 210/474; 210/477; 210/497.01; 99/319
[58] Field of Search ............... 210/471, 464, 469, 419, 210/474, 479, 480–482, 477, 497 R; 99/279, 292, 304, 316–318, 319, 305, 306

[56] References Cited

U.S. PATENT DOCUMENTS

| 3,764,017 | 10/1973 | Dover | 210/481 |
| 3,943,058 | 3/1976 | Wurm | 210/482 |
| 4,110,221 | 8/1978 | Moser | 210/481 |

FOREIGN PATENT DOCUMENTS

| 2802240 | 7/1979 | Fed. Rep. of Germany | 210/481 |
| 269298 | 4/1927 | United Kingdom | 210/482 |

Primary Examiner—Benoit Castel
Attorney, Agent, or Firm—Frederick E. Bartholy

[57] ABSTRACT

This invention relates to a coffee filter comprising a drip catcher, a container and a filter insert designed to be introduced into the container, the filter insert comprising filter surfaces of a perforated metal foil and the container comprising a single outflow opening in its base.

5 Claims, 3 Drawing Figures

U.S. Patent      Mar. 17, 1981      4,256,585
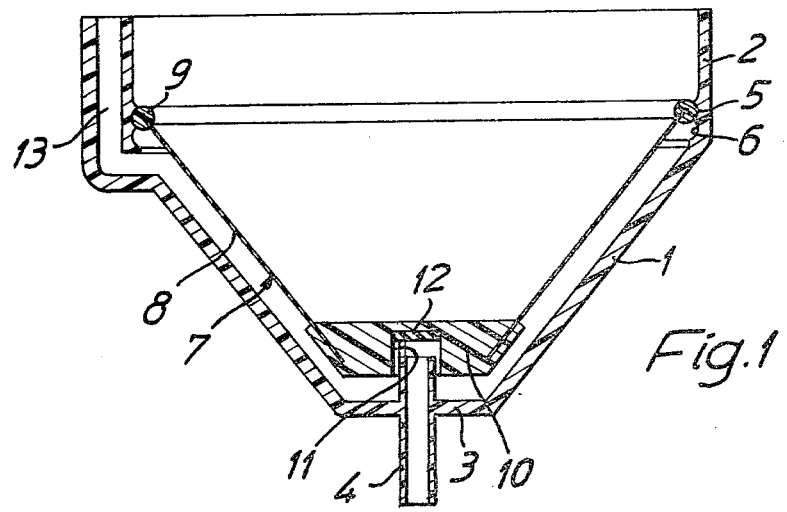
Fig.1
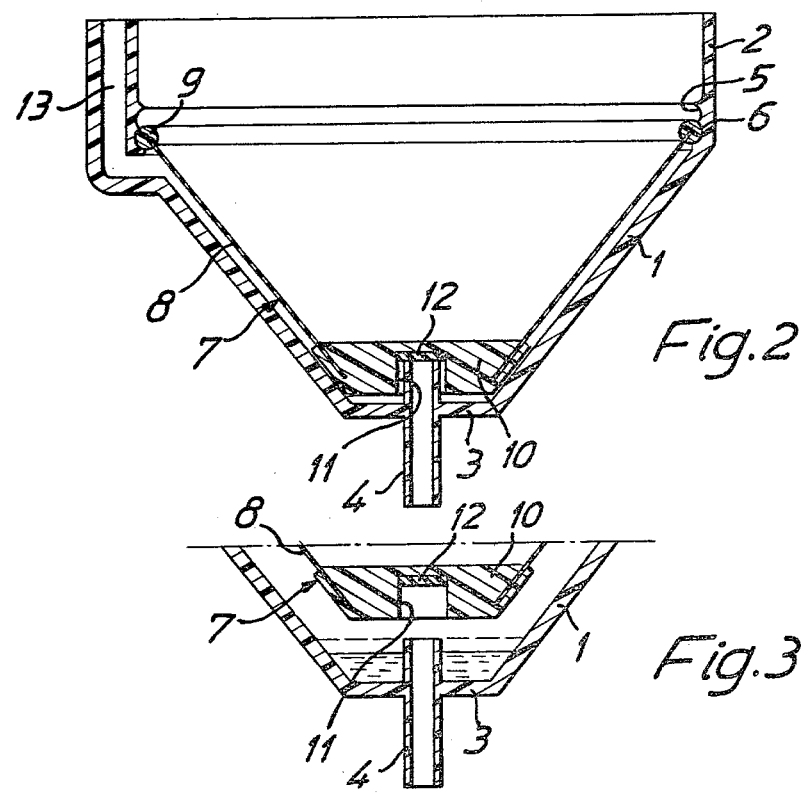
Fig.2
Fig.3

COFFEE FILTER WITH DRIP TRAY

BACKGROUND OF THE INVENTION

The problem of coffee filters of this type is that the remainder of the boiling water only flows off from the filter in drips. In order not unnecessarily to lengthen the time taken by the filtering process, it would be desirable to be able to terminate the filtering process after most of the boiling water has passed through and to collect the filtrate dripping off the filter.

OBJECT OF THE INVENTION

The object of the present invention is to provide a drip catcher which is suitable for this purpose and which has a sufficiently large collection volume, but which retains hardly any filtrate in the filtering position of the coffee filter.

SUMMARY OF THE INVENTION

According to the invention, this object is achieved in that, in a coffee filter of the type referred to at the beginning, the outflow opening is in the form of a tube which projects beyond the inner surface of the base of the container and in that, in the region of its base, the filter insert comprises a fluid-impermeable cover element provided on its side facing the container with a blind hole which, in the operational state of the coffee filter, surrounds the tube over a part of its length with a gap in between. In this way, it is ensured that, in the operational state, i.e. during filtering, the filtrate flows down through the tube not only by gravity, but also by siphon effect.

The intermediate space between the container and the filter insert preferably communicates with the atmosphere at a point remote from the base region. In this way, it is not possible where finely ground coffee powder is used for any vacuum which would prevent the filtrate from flowing down to be built up in this intermediate space.

The distance between the wall of the blind hole and the tube should preferably be less than 1.5 mm. It is favourable if, in addition, the container is also separated by a distance of less than 1.5 mm from the adjacent surface of the spacer member.

The tube may additionally project beyond the container on the outside thereof. This provides for an increased suction effect because the suction effect is dependent upon the length of the tube.

One particular embodiment is characterised in that the filter insert is designed to be locked in at least two rest positions on the container, in that in one rest position the cover element is at a distance from the tube on all sides and in that, in the other rest position, the bottom of the blind hole rests on the front edge of the tube. This ensures that the outflow opening of the coffee filter is closed in the other rest position so that the filter may also be used as a tea filter.

BRIEF DESCRIPTION OF THE DRAWINGS

One embodiment of the invention is described by way of example in the following with reference to the accompanying diagrammatic drawings, wherein:

FIG. 1 is an axial section through a coffee filter in its working position.

FIG. 2 is an axial section corresponding to FIG. 1 in the closed position.

FIG. 3 is an axial section through the lower part of the coffee filter in the position in which the drip catcher is active.

PREFERRED EMBODIMENT OF THE INVENTION

The coffee filter shown in FIGS. 1 to 3 comprises a substantially conical container 1 which merges at its wide end into a cylindrical region 2 and at its lower end in FIG. 1 into a base region 3.

The base region is provided with a central opening into which a tube 4 is inserted in fluid-tight manner in such a way that it projects beyond the base region on either side thereof.

On its inner surface, the cylindrical region 2 comprises a first annular depression 5 and an axially adjacent second annular depression 6.

The coffee filter further comprises a filter insert 7 which has a frustoconical perforated metal foil 8 as the actual filter element. The larger-diameter edge of the perforated metal foil 8 is embedded in a plastic ring 9 of which the shape and size are such that it is able to engage in the annular depressions 5 or 6.

The other region is embedded in a frustoconical cover element 10 provided with a central blind hole 11 of which the internal diameter is larger than the external diameter of the tube 4. A disc 12 of a soft, elastic material is inserted into the blind hole 11, resting on the bottom thereof. The dimensions of the blind hole and of the disc 12 are selected in such a way that, in the first rest position where the plastic ring 9 is engaged in the first annular depression 5, the tube 4 is separated by a gap on all sides from the cover element 10 and the disc 12 so that a fluid flow path is formed. In the working position used for filtering which is shown in FIG. 1, the filtrate collecting in the intermediate space between the container 1 and the filter insert 7 is able to flow down between the wall of the blind hole 11 and the tube 4. On completion of the filtering process, the rest of the filtrate is removed from the intermediate space by siphon effect.

FIG. 2 shows the second position of the filter insert 7 in which the plastic ring 9 is engaged in the second annular depression 6 and the disc 12 rests on the front edge of the tube 4 so that the outflow opening is closed. This position may be used for preparing tea or for lengthening the extraction time of coffee, for example when only a small amount of coffee powder and/or coarsely ground coffee powder is used.

When the filter insert 7 is raised to such an extent that the tube 4 no longer projects into the blind hole 11, as shown in FIG. 3, dripping filtrate is able to collect over the base region 3 up to the level of the tube 4 as shown in FIG. 3.

To ensure that the filtrate flows off completely from the intermediate space before the drip catcher becomes active, it is of advantage to connect the intermediate space to the atmosphere at a point remote from the base region 3. This purpose is served for example by a semi-circular passage 13 which adjoins the cylindrical region 2 and which, at one end, opens into the intermediate space between the filter insert 7 and the container 1 and, at its other end, extends up to the front edge of the cylindrical region 2. In this way, a connection with the atmosphere is established on the one hand whilst, on the other hand, no boiling water or filtrate is able to flow off through this connection.

I claim:

1. A coffee filter comprising a drip catcher, a substantially conical container having an upper cylindrical region and a filter insert inserted into the container and comprising filter surfaces of a frustoconical perforated metal foil (8), which surfaces are situated at a distance from the wall of the container thereby establishing an intermediate space and the container comprising a single outflow opening in its base, characterised in that the outflow opening is in the form of a tube (4) which projects beyond the inner surface of the base (3) of the container (1), and in that, in the region of its base, the filter insert (7) comprises a fluid-impermeable cover element (10) which is provided on its side facing the container with a blind hole (11) having a soft disc (12) inserted therein, which blind hole in the operational state of the coffee filter, surrounds the tube (4) over part of its length with a gap in between, said filter insert (7) being designed to be locked in at least two rest positions on the container (1), in that in one rest position the cover element (10) is at a distance from the tube (4) on all sides and in that, in the other rest position, the bottom of the blind hole (11) rests on the front edge of the tube (4), said rest position being determined by a first annular depression (5) and an axially second annular depression (6) on the inner surface of the cylindrical region (2).

2. A coffee filter as claimed in claim 1, characterised in that the intermediate space between the container (1) and the filter insert (7) communicates with the atmosphere at a point remote from the base region (3).

3. A coffee filter as claimed in claim 1 or 2, characterised in that the interval separating the wall of the blind hole (11) from the tube (4) is less than 1.5 mm.

4. A coffee filter as claimed in any one of claims 1, 2 or 3, characterised in that the container (1) is separated by a distance of less than 1.5 mm from the adjacent surface of the spacer member (10).

5. A coffee filter as claimed in claim 4, characterised in that the tube (4) additionally projects beyond the container on the outside thereof.

* * * * *